MARLIN S. BOLT, OF ELMIRA, NEW YORK.

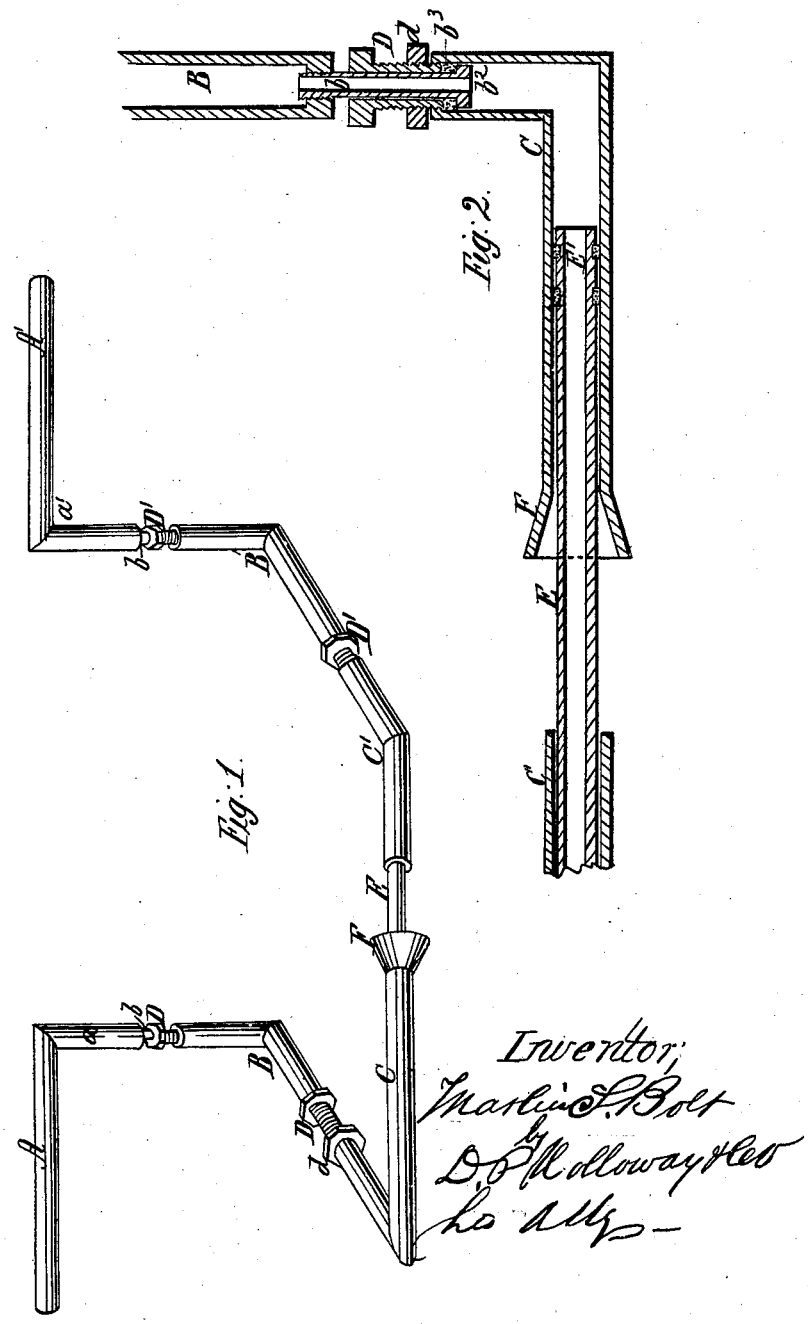

Letters Patent No. 85,559, dated January 5, 1869.

PIPE-CONNECTION IN RAILROAD-CAR HEATERS.

The Schedule referred to in these Letters Patent and making part of the same.

*To all whom it may concern:*

Be it known that I, MARLIN S. BOLT, of Elmira, in the county of Chemung, and State of New York, have invented a new and useful Improved Joint-Pipe for Connecting Hot-Air or Steam-Pipes attached to Railroad-Cars; and I do hereby declare that the following is a full, clear, and exact description of the same, reference being had to the annexed drawings, making part of this specification, in which—

Figure 1 is a perspective view, and

Figure 2 is a longitudinal section.

The same letters in all the figures indicate identical parts.

My improvements relate to a system of jointed pipes for connecting the hot-air or steam-pipes attached to railroad-cars in such manner as to permit the free motion of the cars without breaking the continuity of the pipes, and consists in the connection of a series of pipes and elbows by a system of joints so arranged as to allow the cars to swing from side to side, or up and down, or to approach or to separate, without disconnecting the pipes.

In the annexed drawings—

A and A' are the ends of the pipes attached permanently to the respective cars, terminating with an elbow, $a$ $a'$, as shown in fig. 1.

B and B are two elbow-pipes connected with the pipes A A', respectively, in the following manner: One of the pipes has a short pipe, $b$, tapped into the end. This pipe is of comparatively small diameter. It has on its extremity a head, $b^2$, and it is surrounded by a sleeve, D, having a screw-thread cut on it, and a nut-head, so that it may be screwed tightly into the other pipe, as clearly shown in fig. 2.

The sleeve screws down on to the packing $b^3$, which prevents the escape of the air or steam. By turning this nut, the pipes may be kept tight.

A jam-nut, shown at $d$, may be used to prevent the nut D from shaking loose.

The stem $b$ forms a joint, upon which the elbows B or B' may swing freely, horizontally. This will accommodate the lateral oscillation of the cars.

In order to permit their independent vertical action, the elbows C and C' are attached to the elbows B and B, the elbows being set at right angles to one another, and connected by the same sort of joints as already described.

In order to couple the pipes, and to permit the cars to approach and recede from one another, the stem E is attached to the end of one of the pipes, say C', and a socket, F, having a funnel-formed mouth, is attached to the other, say C. This mouth F makes it easy to couple the pipes, and the stem E, having packing at E', as shown, may move out or in, in the centre of the pipe C, without permitting the pipe to leak.

I am aware that various forms of pipes for this purpose have been used or proposed to be used. My claim is therefore not broadly to either the principle or construction of the particular parts. My improvements differ from others n the combination of the stem and sleeve-joint with a system of elbowed and jointed pipes, and also in the combination of a stem and flaring socket with a system of jointed pipes, such as I have shown; and my claim for novelty is restricted to the combination, as shown and set forth.

I am aware that the socket and stem are not new in themselves, nor do I wish to lay claim to them.

What I claim as my invention, and desire to secure by Letters Patent, is—

1. The combination of the elbowed pipes A A', permanently attached to the cars, the elbows B and B' and C C', when said pipes are connected by a joint formed by the stem $b$ and sleeve D, constructed and arranged to operate substantially as and for the purpose set forth.

2. In combination with the above, the stem E and socket F, all arranged to operate substantially in the manner and for the purpose set forth.

In testimony whereof, I have signed my name to this specification, in the presence of two subscribing witnesses.

MARLIN S. BOLT.

Witnesses:
VIRGIL T. DURYEA,
R. H. RANSOM.